United States Patent

[11] 3,587,640

[72] Inventor Paul Edmund Hanser
 Moline, Ill.
[21] Appl. No. 876,469
[22] Filed Nov. 13, 1969
[45] Patented June 28, 1971
[73] Assignee Deere & Company
 Moline, Ill.

[54] DIRECTIONAL CONTROL VALVE
 16 Claims, 2 Drawing Figs.
[52] U.S. Cl. .................................................. 137/596.14,
 137/625.64
[51] Int. Cl. ...................................................... F16k 11/04
[50] Field of Search ............................................ 137/636.1,
 596.14, 596.15, 596.16, 625.69, 596, 596.12,
 596.13, 596.17, 596.18, 596.1, 596.2, 625.2,
 625.64, 625.25, 625.67

[56] References Cited
 UNITED STATES PATENTS
2,317,628 4/1943 Martin ........................... 137/596.2
2,650,609 9/1953 Herbst ........................... 137/596.14X
3,043,335 7/1962 Hunt ............................. 137/625.66X
3,108,612 10/1963 Hofmann et al. ............... 137/596.16

Primary Examiner—M. Cary Nelson
Assistant Examiner—Robert J. Miller
Attorneys—H. Vincent Harsha, Harold M. Knoth, William A. Murray, John M. Nolan and Jimmie R. Oaks ABSTRACT: A directional control valve for a hydraulic function includes a pair of sleeve-lined bores that have consecutive first, second and third axially-spaced grooves between a closed end and an end which opens into a fluid reservoir. The first, second and third grooves of one bore are, on the one hand, respectively connected to a source of fluid pressure, one function control port and the other function control port and are, on the other hand, respectively connected to the first, third and second grooves of the other bore. Valve pistons are axially shiftable in the bores and have first and second valve surfaces normally biased against first and second valve seats in the bore to establish a neutral condition wherein fluid pressure is blocked in and from the function control ports. The valve pistons have heads, between the first grooves and closed ends of the bores, across which pressure drops are selectively independently or simultaneously created for shifting the valve pistons to respectively establish first and second active conditions or a flat condition wherein one or the other of the cylinder control ports is connected to the fluid pressure while the remaining control port is connected to the reservoir or wherein both control ports are connected to the reservoir. The pressure drops are selectively created by permitting flow from the first grooves of the bores to the reservoir via orifices in the heads of and normally closed axial passages through the valve pistons. In one embodiment, a mechanical control opens the axial passages to permit flow and in a second embodiment, an electrical control opens the axial passages to permit flow.

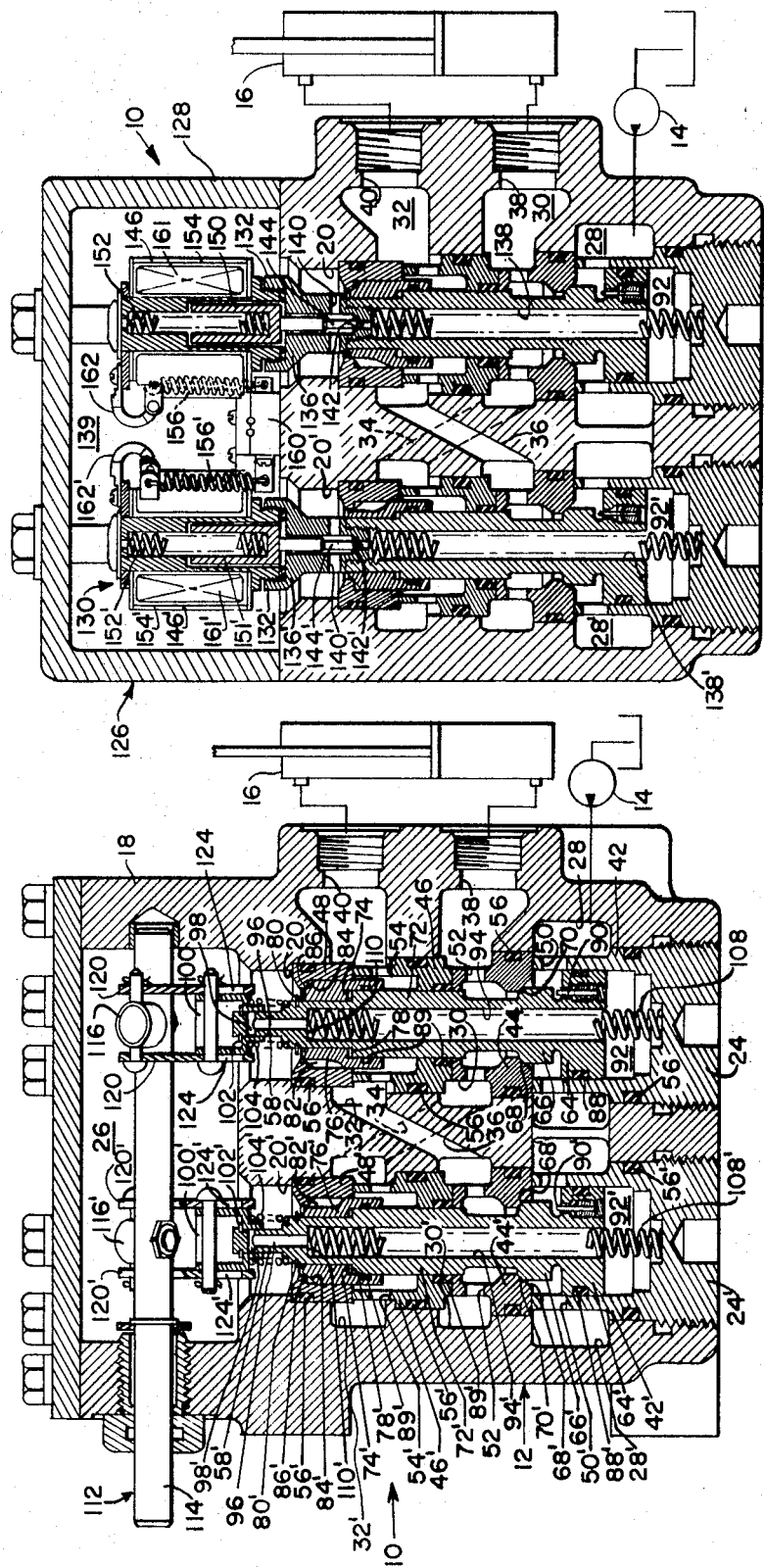

DIRECTIONAL CONTROL VALVE

BACKGROUND OF THE INVENTION

This invention relates to a directional control valve and more particularly relates to a valve for controlling the operation of a hydraulic function.

Spool valves are commonly used as direction control valves for controlling the operation of hydraulic cylinders and usually the valves are of a type wherein the lands of the spool are in metal-to-metal contact with the valve bore. To operate properly, spool valves of this type must be manufactured with close tolerances, otherwise undesirable leakage occurs around the lands. The cost of precision equipment necessary to maintain these tolerances is not justified unless the manufacturer is solely in the business of making valves.

SUMMARY OF THE INVENTION

According to the present invention, there is provided a novel direction control valve for a hydraulic function and more particularly there is provided a control valve of the poppet type.

It is an important object of the invention to provide a control valve that is rugged, durable, of simple and inexpensive construction and positive in action. Specifically, it is an object to provide a pair of interconnected valve bores which are connected to a source of fluid pressure, the control ports of the hydraulic function and a fluid reservoir; and to provide valve pistons, in the bores, that carry poppets and are normally biased to a normally closed position establishing a neutral condition in the valve wherein fluid under pressure is blocked in and from the cylinder control ports and are selectively independently or simultaneously shiftable to respectively establish active conditions in the valve wherein one or the other of the cylinder control ports is connected to the source of fluid pressure while the remaining control port is connected to the fluid reservoir or wherein both control ports are connected to the fluid reservoir.

Another object is to provide a double poppet valve wherein one of the poppets is mounted for limited axial shifting relative to the other.

Still another object is to provide a compact arrangement wherein the fluid reservoir is defined by the valve body and the valve bores have one of their ends open to the reservoir.

A more specific object is to provide, as part of the fluid pressure means, an axial fluid passage through the pistons normally blocked by a closure member and a first embodiment wherein a mechanical control acts to selectively remove the closure member from one or the other of the fluid passages and a second embodiment wherein an electrical control acts to perform the last-mentioned function.

Still a further object is to provide, as part of the electrical control, a pair of solenoids in the fluid reservoir mounted for shifting movement with the valve pistons and having coil spring leads to minimize fatigue.

These and other objects will become apparent from the detailed description and accompanying drawings.

BRIEF DESCRIPTION OF THE DRAWINGS

FIG. 1 is a partial schematic and sectional view of the hydraulic control system showing the control valve in its neutral condition and showing a mechanical control for acting on the closure members.

FIG. 2 is a view similar to FIG. 1 but showing a slightly modified valve and an electrical control for acting on the closure members.

DESCRIPTION OF THE PREFERRED EMBODIMENTS

Referring now to the drawings, there is shown in FIG. 1 a fluid system 10 including a directional control valve 12, a source of fluid pressure 14 and a hydraulic function shown as a double-acting hydraulic cylinder or motor 16.

The control valve 12 includes a valve body 18 defining right and left, substantially identical bore means including parallel bores 20 and 20'. The bores are closed at their lower ends by caps 24 and 24' and the upper ends of the bores open into a reservoir or cavity 26 defined by the upper portion of the valve body 18. The bores 20 and 20' include first, second, and third axially-spaced, annular grooves 28-28', 30-30' and 32-32' consecutively between their closed and open ends. The grooves 28 and 28' are interconnected and the grooves 30 and 32' are connected by a fluid passage 34 and the grooves 32 and 30' are interconnected by a fluid passage 36. The grooves 28, 30 and 32 are additionally respectively connected to the source of fluid pressure 14, a first control port 38 of the hydraulic cylinder 16 and a second control port 40 of the hydraulic cylinder.

The bore means further includes sleeves in the bores 20 and 20' which are divided into abutting sections 42-42', 44-44' 46-46' and 48-48' consecutively from the bottoms to the tops of the bores and the sleeve sections respectively have a plurality of radial ports 50-50', 52-52' and 54-54' permitting flow from the grooves to the interiors of the sleeve sections.

The bottom sleeve sections 42 and 42' are continuations of the end caps 24-24' and the sleeve sections 44-44', 46-46' and 48-48' respectively tightly engage the walls of the bores 20 and 20' between adjacent ones of the grooves 28-28', 30-30' and 32-32' and the open ends of the bores. O-ring seals 56-56' in circumferential grooves in each sleeve section prevent leakage between the sleeve sections and the bores 20 and 20'.

Valve pistons 58 and 58' (FIG. 1), are received for axial shifting movement in the sleeve sections. The valve pistons 58 and 58' have heads 64 and 64' at their lower ends. Spaced axially from the heads 64 and 64' are first lands 66 and 66' which have upper annular poppet valve surfaces 68 and 68' in opposed relation to valve seats 70 and 70' on the sleeve sections 44 and 44' between the grooves 28-28' and 30-30'. Second lands 72 and 72' are spaced axially from the first lands 66 and 66' in fluidtight engagement with the interior of the sleeve sections 46 and 46' and terminate in upper shoulders 78 and 78'. The valve pistons 58 and 58' further include collarlike third lands 76 and 76' removably received at their upper ends. The lands 76 and 76' are held from shifting downwardly by interior shoulders 74 and 74' that engage the shoulders 78 and 78' and snap rings 80 and 80' on the pistons 58 and 58' above the lands 76 and 76' releasably retain the latter in place. The lands 76 and 76' have a plurality of exterior circumferentially-spaced axial flow metering grooves 82 and 82' that terminate upwardly at poppet valve surfaces 84 and 84'. The valve surfaces 84 and 84' are in opposed relation to valve seats 86 and 86' on the sleeve sections 48 and 48' between the grooves 32 and 32' and the open ends of the bores 20 and 20'. O-rings 88 and 88' in annular grooves in the heads 64 and 64' prevent leakage between the sleeve sections 42-42' and the heads 64 and 64'. Similarly, O-ring seals 89-89' prevent leakage between the lands 72-72' and the sleeve sections 46-46' and the removable lands 76-76'.

Valve pistons 58 and 58' are selectively shifted axially within the sleeves by creating pressure drops across one or the other or both of the heads of the pistons. These pressure drops are created by structure including variable orifices 90 and 90' through the piston heads 64 and 64', to establish fluid communication between the grooves 28 and 28' at the upper faces of the heads 64 and 64' and chambers 92 and 92' defined by the lower faces of the heads 64 and 64' and the closed ends of the bores 20 and 20'. the chambers 92 and 92' are in turn connected to the fluid reservoir 26 via axial passages 94 and 94' through the valve pistons 58 and 58'. The axial passages 94 and 94' have reduced diameter upper portions 96 and 96' intersected by cross openings 98 and 98' which connect the portions 96 and 96' to the interiors of the open bore ends and thus, to the reservoir.

Tubular closure members 100 and 100' are mounted for axial shifting movement on the upper ends of the pistons 58 and 58' The closure members normally mask or block the cross openings 98 and 98' in the pistons to prevent flow from the axial passages to the reservoir and are biased in place against snaprings 102 and 102' carried at the upper ends of the valve pistons 58 and 58' by means of springs 104 and 104' which act between shoulders on the valve pistons and the closure members.

The valve pistons 58 and 58' are normally biased upwardly to seat their valve surfaces and maintain a neutral condition in the valve 12 wherein fluid pressure is blocked in and from the control ports of the hydraulic cylinder 16. Specifically, biasing is accomplished by springs 108 and 108' that act between the end caps 24 and 24' and shoulders 110 and 110' within the axial passages 94 and 94'.

A mechanical control 112 for selectively shifting the closure members 100 and 100' against the bias of the springs 104 and 104' to unmask the cross openings 98 and 98' is mounted within the reservoir 26 above the valve pistons 58 and 58' and is operative, as explained more fully below, to selectively initiate the creation of pressure drops across the piston heads causing the pistons to shift and establish first and second active conditions in the valve wherein one or the other of the control ports of the hydraulic cylinder 16 is connected to fluid pressure while the remaining control port is connected to the reservoir 26. The mechanical control 112 includes a control rod 114 journaled in opposite walls of the reservoir 26 for rotation about an axis crosswise to the valve pistons 58 and 58'. A first arm 116 is fixed to and projects forwardly from the control rod 114 above the valve piston 58 and a second arm 116' is fixed to and projects rearwardly from the control rod above the valve piston 58'. Pairs of spaced parallel links 120 and 120' respectively interconnect the arms 116 and 116' with the closure members 100 and 100'. The connections with the closure members include respective lost-motion slots 124 and 124'.

In an alternative form of the invention (FIG. 2), a control valve 126 is illustrated that has a slightly different valve body 128, and instead of a mechanical control, an electrical control 130 is used to control selective shifting of a pair of identical valve pistons 132 and 132'. The valve bores, sleeves and bottom sections of the valve pistons 132 and 132' are similar in all respects to the corresponding structure in the embodiment illustrated in FIG. 1 and for simplicity like reference numerals are used.

The valve pistons 132 and 132' include upper sections 136 and 136' threadedly received within the upper ends of the bottom sections. Axial passages 138 and 138' extend through the valve pistons 132 and 132' and cross passages 140 and 140' in the upper valve piston sections 136 and 136' connect the passages 138 and 138' with the interiors of the open-end portions of the bores 20 and 20' and thus, to a reservoir 139. Valve seats 142 and 142' are in the axial passages 138 and 138' upstream from or below the cross passages 140 and 140' and closure or valve members 144 and 144' are normally seated for preventing flow from the passages 138 and 138' to the reservoir 139.

The electrical control 130 includes a pair of identical solenoids 146 and 146' in the reservoir 139 affixed respectively to the valve pistons 132 and 132'. Cuplike solenoid core members 150 and 150' are affixed to the tops of the valve members 144 and 144' and springs 152 and 152' act between the upper end of solenoid casings 154 and 154' and the core members to normally bias the valve members 144 and 144' against the seats 142 and 142'.

Electrical energy is supplied to the solenoids 146 and 146' via coil spring leads 156 and 156' connected at one end to an appropriate lead connector 160 fixed to the bottom of the reservoir 139. The other ends of the leads 156 and 156' are connected to one end of the solenoid windings 161 and 161'. A second pair of leads 162 and 162' connect the other ends of the solenoid windings to ground via the solenoid casings 154 and 154'.

The operation of the embodiment of FIG. 1 is as follows: Normally the springs 104 and 104' bias the closure members 100 and 100' to block the cross openings 98 and 98' to prevent flow from the axial passages 94 and 94' to the reservoir 26. Also the springs 108 and 108' normally bias the valve pistons 58 and 58' upwardly to seat the valve surfaces 68 and 68' and 84 and 84' and establish a neutral condition in the control valve 12 wherein fluid pressure is blocked in and from the control ports 38 and 40 of the hydraulic cylinder 16. In this condition, fluid pressure on the opposite faces of the piston heads 64 and 64' is equal.

Clockwise rotation of the control rod 114, as viewed from the left, moves the arm 116 downwardly. The arm acts through the links 120 to shift the associated closure member 100 downwardly to compress the spring 104 and expose the cross openings 98 to the reservoir 26. This permits fluid pressure in the chamber 92 at the bottom of the piston 58 to exhaust to the reservoir via the axial passage 94 and flow then occurs through the variable orifice 90 causing a pressure drop across the piston head 64. The pressure drop causes the piston 58 to shift downwardly and connect the fluid under pressure in the groove 28 to the cylinder control port 38 via groove 30 and simultaneously connect the cylinder control port 40 to the reservoir 26 via groove 32 and the open end of the bore 20. It is to be noted that the lost-motion slots 124' in the links 120' permit the control rod 114 to be rotated clockwise without disturbing the closure member 100' associated with the valve piston 58'. Similarly, counterclockwise rotation of the control rod 114 moves the arm 116' downwardly and the arm acts through the links 120' to shift the associated closure member 100' downwardly to expose the axial passage 94' in the piston 58' to the reservoir 26 and initiate a pressure drop across the head of the piston 58' to shift the latter downwardly. This time, however, the control port 40 of the hydraulic cylinder 16 is connected to the fluid pressure in the groove 28' of the bore 20' via the cross passage 36 and the groove 32 of the bore 20 and the groove 30' of the bore 20' and the control port 38 of the hydraulic cylinder is connected to the reservoir 26 via the groove 30 of the bore 20, the cross passage 34, the groove 32' of the bore 20' and the open end of the bore 20'. It may be desirable in some applications of the control valve 12 to simultaneously shift the valve pistons 58 and 58' to establish a float condition in the hydraulic actuator 16 wherein both of the control ports 38 and 40 are connected to the reservoir 26. For such applications, individual control rods or any other suitable control means may be used, in lieu of the control rod 114, to simultaneously shift the closure members 100 and 100' and cause simultaneous shifting of the valve pistons 58 and 58' as described above.

The operation of the electrically-operated control valve 126 in FIG. 2 is generally the same as that for the mechanically-operated valve 12, the only difference being that the pressure drops across the piston heads 64 and 64' of the valve pistons 132 and 132' are initiated by selectively energizing one or the other or both of the solenoids 146 and 146' to move one or the other or both of the core members 150 and 150' upwardly against the bias of the associated one or both of the springs 152 and 152' and raise the desired one or both of the valve members 144 and 144' from the associated seat or seats and permit passage of fluid from the associated one or both of the axial passages 138 and 138' to the reservoir 139 via one or both of the cross openings 140 and 140'.

The solenoids 146 and 146' are cooled by the oil in the reservoir and the coil spring leads 156–156' and 162–162' permit the solenoids to rise and fall with the valve pistons 132 and 132' as the latter shift within the bores 20 and 20'.

It is to be noted that manufacturing tolerances to insure simultaneous tight seating of the double poppet valve surfaces 68, 84 and 68', 84' are easily maintained by virtue of the fact that the upper poppet valve surfaces 84 and 84' shift with the removable lands 76 and 76' a limited amount axially on the pistons 58 and 58' between the shoulders 78, 78' and the snap rings 102, 102'.

I claim:

1. A fluid system for controlling the operation of a hydraulic function comprising: a valve body defining a pair of valve bore means, a source of fluid pressure connected to one end of the pair of bore means and a fluid reservoir connected to the other end of the pair of bore means, the control ports of the hydraulic cylinder being respectively connected to one of the pair of bore means at a pair of axially-spaced locations between its opposite ends, the other of the pair of bore means having a similar pair of axially-spaced locations cross-connected with the pair of locations of the one bore means, valve seats in the pair of bore means respectively between the one end and one of the pair of locations and between the other end and the other of the pair of locations, a pair of valve pistons each mounted for axial shifting movement in a respective one of the pair of bore means and having valve surfaces for seating engagement with the valve seats, means normally biasing the valve pistons to seat the valve surfaces for establishing a neutral condition in the control valve wherein fluid pressure is blocked in and from the control ports of the hydraulic cylinder and control means for selectively independently shifting one or the other or both of the valve pistons to remove the accompanying valve surfaces from their seats and establish one or the other of first and second active conditions or a float condition in the control valve wherein the source of fluid pressure is respectively connected to one or the other of the control ports while the remaining control port is connected to the fluid reservoir or wherein both control ports are connected to the fluid reservoir.

2. The invention defined in claim 1 wherein the fluid reservoir is defined by the valve body at the other end of the pair of bore means, the latter opening directly into the fluid reservoir.

3. The invention defined in claim 1 wherein the pair of bore means are closed at their one end below their connections to the source of fluid pressure, the pair of valve pistons further including piston heads having spaced faces between the closed end of the pair of bore means and the connections of the source of fluid pressure to the bore means, a pair of orifices respectively extending between the spaced faces of the heads permitting fluid pressure to enter the bore means between the closed ends and the heads, a pair of fluid passage means connecting the closed ends of the bore means to the fluid reservoir and said control means including a pair of closure members normally blocking fluid from flowing to the reservoir through the pair of fluid passage means and means for selectively moving one or the other of the closure members from blocking the fluid passages whereby flow is permitted through the associated orifice creating a pressure drop across the piston head to shift the valve piston to unseat the valve surfaces carried thereby and establish one or the other of the active conditions.

4. The invention defined in claim 3 wherein the pair of fluid passage means includes axial passages extending substantially through the valve pistons.

5. The invention defined in claim 4 wherein the valve body defines a fluid reservoir at the other ends of the pair of valve bore means.

6. The invention defined in claim 5 wherein the fluid passage means further includes cross openings interconnecting each of the axial passages with the open ends of the associated bore, and wherein said closure members are reciprocally mounted about the valve pistons and include portions normally blocking the cross openings and wherein the means for selectively removing the closure members from the cross openings includes a control rod rotatably mounted in the valve body for rotation about an axis within the reservoir crosswise to the valve pistons, and lost-motion means operatively interconnecting the control rod to the closure members for permitting the closure members to remain in their normal position when the control rod is in a neutral position, for effecting removal of only one of the closure members upon rotating the rod in one direction from the neutral position and for effecting removal of only the other of the closure members upon rotating the control rod in the other direction from the neutral position.

7. The invention defined in claim 5 wherein the fluid passage means further includes cross openings interconnecting each of the axial passages with the open end of the associated bore, and wherein said closure members include a pair of valve members reciprocally mounted in the axial passage, a valve seat in each of the axial passages upstream from the cross openings, said valve members normally being in seating engagement with the last-mentioned valve seats whereby fluid flow is blocked from occurring between the axial passages and the fluid reservoir, and a pair of solenoids integral with the valve pistons and each having a core member integral with an associated valve member whereby upon energizing one or the other of the solenoids one or the other of the valve members will be unseated to permit flow through the associated axial passage to the reservoir.

8. A hydraulic control valve comprising: bore means having at least one closed end, the other end of said bore means being adapted for connection to a fluid reservoir; first, second and third fluid passages connected to said bore means at axially-spaced locations between the one closed end and the other end of said bore means, said first, second and third fluid passages being adapted for connection to a source of fluid pressure, a first function control port and a second function control port, respectively; valve seat means in said bore means between the first and second fluid passages and between the third fluid passage and the other end of said bore means; valve piston means and including valve surface means located for seating engagement with said valve seat means and piston head means positioned between the first fluid passage and the one closed end of said bore means; bias means normally urging said valve piston means so as to seat the valve surface means carried thereby against the valve seat means in said bore means for establishing a neutral condition in said control valve wherein the first fluid passage is blocked from communication with the second and third fluid passages and the second and third fluid passages are blocked from fluid communication with the other end of said bore means; control means for shifting said valve piston means for selectively establishing a first active condition wherein the first fluid passage is connected to the second fluid passage and the third fluid passage is connected to the other end of said bore and a second active condition wherein the first fluid passage is connected to the third fluid passage and the second fluid passage is connected to the other end of said bore means, said control means including orifice means through said head means fluidly communicating the first fluid passage with the one closed end of said bore means, fluid passage means adapted for connecting the one closed end of said bore means with a fluid reservoir and removable closure means operatively associated with said fluid passage means being removable for permitting flow through the fluid passage means whereby flow will occur through the orifice means in the piston head means of said valve piston means resulting in a pressure drop across the head means causing the valve piston means to shift and remove the valve surface means from the valve seat means.

9. The invention defined in claim 8 wherein the fluid passage means includes axial passage means in said valve piston means interconnecting the opposite ends of the bore means.

10. The invention defined in claim 8 wherein the bore means includes a pair of bores, each bore having at least one closed end and the other end being adapted for connection to a fluid reservoir and each bore having first, second, and third axially-spaced grooves between the one closed end and the other end, said first, second and third fluid passages respectively interconnecting the pair of bores at the first grooves, the second and third grooves and the third and second grooves respectively; wherein the valve seat means includes valve seats in each bore between the first groove and closed end and between the third groove and other end; wherein the piston means includes a pair of pistons mounted for axial shifting movement in a respective bore, the valve surface means includes valve surfaces on each piston positioned for seating engagement with the valve seats, the head means includes a head on each piston between the first groove and one closed end of the associated bore, and the orifice means includes an orifice through each head; wherein the fluid passage means includes a pair of separate fluid passages each having one end in fluid communication with the one closed end of the associated bore and the other end adapted for connection with a fluid reservoir; and wherein said closure means includes a pair of closure members, each associated with and normally blocking fluid from flowing through a respective one of the pairs of fluid passages and means for selectively removing one or the other or both of the closure members from the associated fluid passage whereby flow through the passage will be allowed thus permitting flow through the orifice in the piston head causing a pressure drop across the head resulting in shifting the valve piston so as to move the associated valve surfaces away from their seats to establish one or the other of the active conditions in said valve or a float condition wherein the second and third fluid passage means are connected to the reservoir.

11. The invention defined in claim 10 wherein the pair of fluid passage means includes axial passages extending through the valve pistons.

12. The invention defined in claim 11 wherein the fluid passage means further includes cross openings interconnecting each of the axial passages with the other ends of the associated bores, and wherein said closure members are reciprocally mounted about the valve pistons and include portions normally blocking the cross openings and wherein the means for selectively removing the closure members from the cross openings includes a control rod rotatably mounted for rotation about an axis crosswise to the valve pistons, and lost-motion means operatively interconnecting the control rod to the closure members for permitting the closure members to remain in their normal position wherein the control rod is in a neutral position, for effecting removal of only one direction from the neutral position and for effecting removal of only the other of the closure members upon rotating the control rod in the other direction from the neutral position.

13. The invention defined in claim 11 wherein the fluid passage means further includes cross openings interconnecting each of the axial passages with the other ends of the associated bores and wherein said closure members include a pair of valve members reciprocally mounted in the axial passages, a valve seat in each of the axial passages positioned upstream from the cross openings, said valve members normally being in seating engagement with the last-mentioned valve seats, and a pair of solenoids integral with the valve pistons and each having a core member integral with an associated valve member whereby upon energizing one or the other of the solenoids one or the other of the valve members will be unseated to permit flow through the associated axial passage.

14. A hydraulic fluid system for controlling the operation of a hydraulic function comprising: a source of fluid pressure, a fluid reservoir, at least one valve bore defining first, second and third axially-spaced annular grooves connected respectively to said source of fluid pressure and the control ports of said hydraulic function, said valve bore being closed at one end adjacent said first groove and having its other end adjacent said third groove and in fluid communication with said reservoir, a first valve seat in said valve bore between said first and second grooves, a second valve seat in said valve bore between said third groove and said other end, a valve piston mounted for axial shifting movement in said valve bore, said valve piston having a central fluid passage in communication with said one and other ends of said valve bore, a piston head between said first groove and said one end of said valve bore, an orifice in said piston head joining said first groove with said one end, a first valve surface for selective seating engagement with said first valve seat for blocking fluid passage between said first and second grooves and a second valve surface for selective seating engagement with said second valve seat for blocking fluid passage between said third groove and said other end of said valve bore, biasing means urging said first and second valve surfaces against said first and second valve seats, control means including means normally blocking passage of fluid through said central fluid passage but being operable for selectively permitting fluid flow through said central fluid passage whereby flow is permitted from said first annular groove to said reservoir via said orifice and central passage, the flow through the orifice creating a pressure drop across said piston head causing the valve stem to shift and simultaneously unseat said first and second valve surfaces and, thus simultaneously connect the source of fluid pressure to one control port of said hydraulic function via said first and second grooves and the other control port of said hydraulic function to said reservoir via said third groove and said other end of said valve bore.

15. The invention defined in claim 14 and further including a second valve bore identical to the first-mentioned valve bore and having axially shiftable mounted therein a second valve piston identical to the first-mentioned valve piston, the first annular grooves of the opposite bores being interconnected and the second and third annular grooves of the opposite bores being cross-connected, and said control means including means for normally blocking passage of fluid through the central fluid passage of said second piston but being selectively shiftable for permitting fluid flow through said central fluid passage whereby flow is permitted from said first groove of the second bore to the reservoir via the orifice and central passage through the second valve piston, the flow through the orifice creating a pressure drop across the piston head causing said valve piston to shift and simultaneously unseat the first and second valve surfaces and, thus simultaneously connect the source of fluid pressure to the other control port of said hydraulic function via the interconnected first grooves of the opposite bores and the interconnected third and second grooves of the first and second bores respectively and connect the one control port of the hydraulic function to the reservoir via the interconnected second and third grooves of the first and second bores respectively and the other end of the second bore.

16. A hydraulic control valve comprising: at least one valve bore having one closed end and the other end being adapted for connection to a fluid reservoir; first, second and third fluid passages connected to said bore at axially-spaced locations between the ends of the valve bore, said first, second and third fluid passages being adapted for connection to a source of fluid pressure, a first control port of a function and a second control port of the function, respectively, first and second annular valve seats in said valve bore between the first and second fluid passages and between the third fluid passage and said other end of the valve bore, a valve piston mounted for axial shifting movement in said valve bore and including first and second poppet valve surfaces spaced for simultaneous seating with said first and second annular valve seats, one of said poppet surfaces being mounted for limited axial shifting movement on said piston, means normally biasing the poppet valve surfaces into seating engagement with the valve seats and control means for shifting the valve piston to unseat the poppet valve surfaces.